United States Patent [19]
Huang

[11] Patent Number: 5,831,521
[45] Date of Patent: Nov. 3, 1998

[54] AUTOMATIC EMERGENCY SIGNAL MEANS FOR VEHICLES

[76] Inventor: Ting-Lung Huang, P.O. Box 55-846, Taipei, Taiwan

[21] Appl. No.: 917,592

[22] Filed: Aug. 26, 1997

[51] Int. Cl.$^6$ .................................................. B60Q 1/50
[52] U.S. Cl. ........................ 340/467; 340/468; 340/479; 200/61.45 R; 200/61.48; 200/61.52
[58] Field of Search ..................................... 340/467, 468, 340/463, 472, 473, 429, 479, 469; 200/61.45 R, 61.48, 61.49, 61.51, 61.52

[56] References Cited

U.S. PATENT DOCUMENTS

| | | | |
|---|---|---|---|
| 3,226,675 | 12/1965 | Edwards | 340/467 |
| 3,731,020 | 5/1973 | York | 200/61.45 R |
| 4,262,177 | 4/1981 | Paxton et al. | 200/61.48 |
| 4,496,808 | 1/1985 | Alexander | 200/61.45 R |
| 4,983,953 | 1/1991 | Page | 340/467 |
| 5,233,141 | 8/1993 | Breed | 200/61.48 |

*Primary Examiner*—Jeffery A. Hofsass
*Assistant Examiner*—Ashok Mannava

[57] ABSTRACT

An antomatic emergency signal device for vehicles including: a casing mounted in a vehicle, a movable weight movable in a groove longitudinally formed in the casing, a sensor actuated by the movable weight due to inertia of the movable weight upon a sudden or emergency braking of the vehicle for sensing a trigger signal, a controller electrically connected with the sensor for receiving the trigger signal output from the sensor, and at least a warning light provided at a rear portion of the vehicle and electrically connected to the controller to be controlled for the turning on or off of the warning light, whereby upon an emergency stop of the vehicle, the warning light will be automatically lit for an effective warning for the following car for enhancing traffic safety.

13 Claims, 5 Drawing Sheets

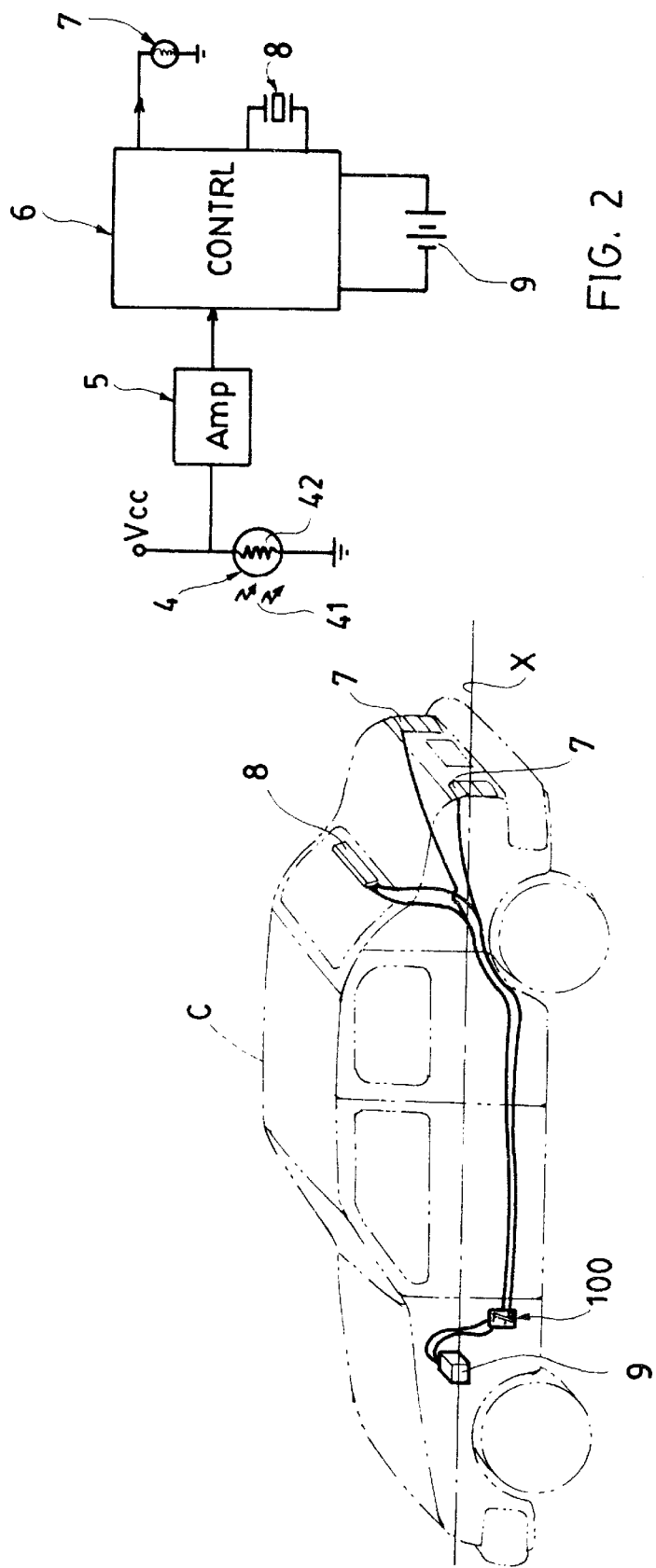

AUTOMATIC EMERGENCY SIGNAL MEANS FOR VEHICLES

BACKGROUND OF THE INVENTION

U.S. Pat. No. 5,381,135 to Robert L. Blount disclosed a vehicle deceleration alerting device including a yellow warning light indicator located at the rear of a lead vehicle to be visible by a tailing vehicle, the yellow warning light being lit when the driver of the lead vehicle releases the depression from the accelerator pedal so as to warn the driver of the trailing vehicle indicating that the lead vehicle has been slowing down.

However, in the situations where the brake pedal is frequently depressed such as in a city of busy traffic, the accelerator pedal will be frequently released just before each depression on the brake pedal. The yellow light indicator of Blount's device will be always lit, thereby easily causing the inadvertence of the driver of the trailing vehicle.

The present inventor has found the drawbacks of the conventional vehicle deceleration alerting device, and invented the present synchronous automatic emergency signal means.

SUMMARY OF THE INVENTION

The object of the present invention is to provide an automatic emergency signal device for vehicles including: casing mounted in a vehicle, a movable weight movable in a groove longitudinally formed in the casing, a sensor actuated by the movable weight due to inertia of the movable weight upon a sudden or emergency braking of the vehicle for sensing a trigger signal, a controller electrically connected with the sensor for receiving the trigger signal output from the sensor, and at least a warning light provided at a rear portion of the vehicle and electrically connected to the controller to be controlled for the turning on or off of the warning light, whereby upon an emergency stop of the vehicle, the warning light will be automatically lit for an effective warning for the following car for enhancing traffic safety.

BRIEF DESCRIPTION OF THE DRAWINGS

FIG. 1 is an illustration showing the installation of the present invention on a vehicle.

FIG. 2 shows a block diagram of the controller circuit of the present invention.

DETAILED DESCRIPTION

Figure 3:
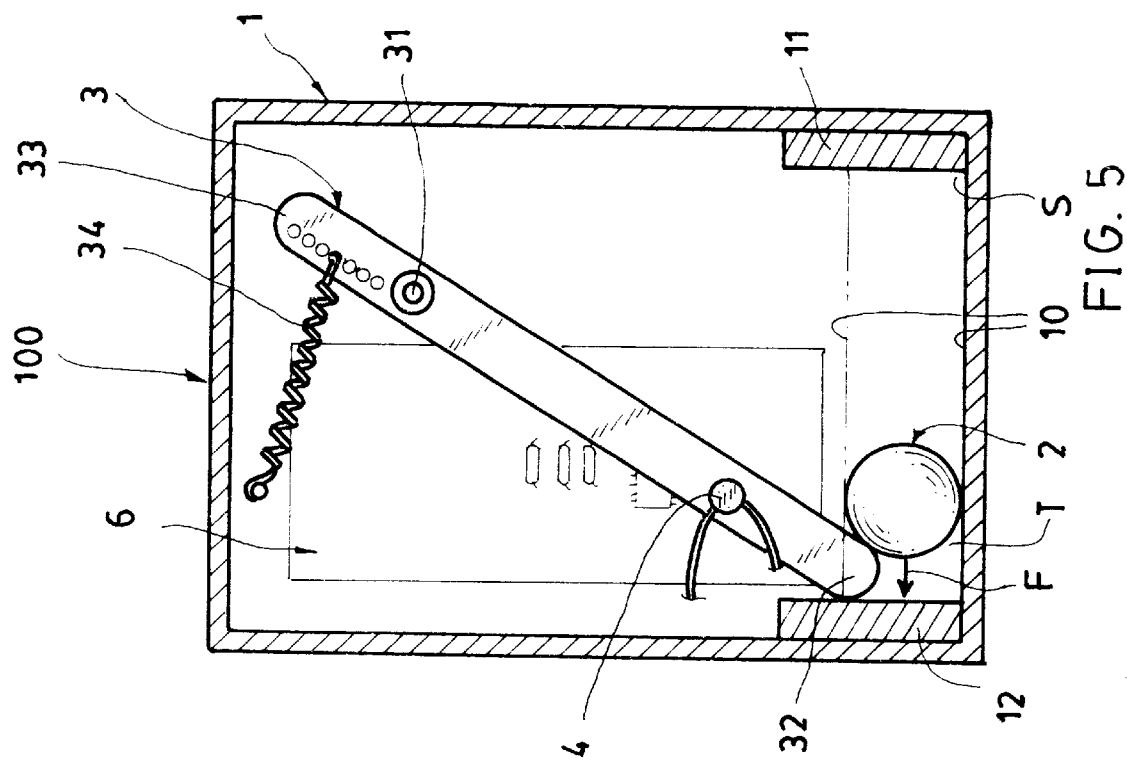
FIG. 3 is a partial sectional drawing of the present invention at its starting or initial state.
Figure 5:
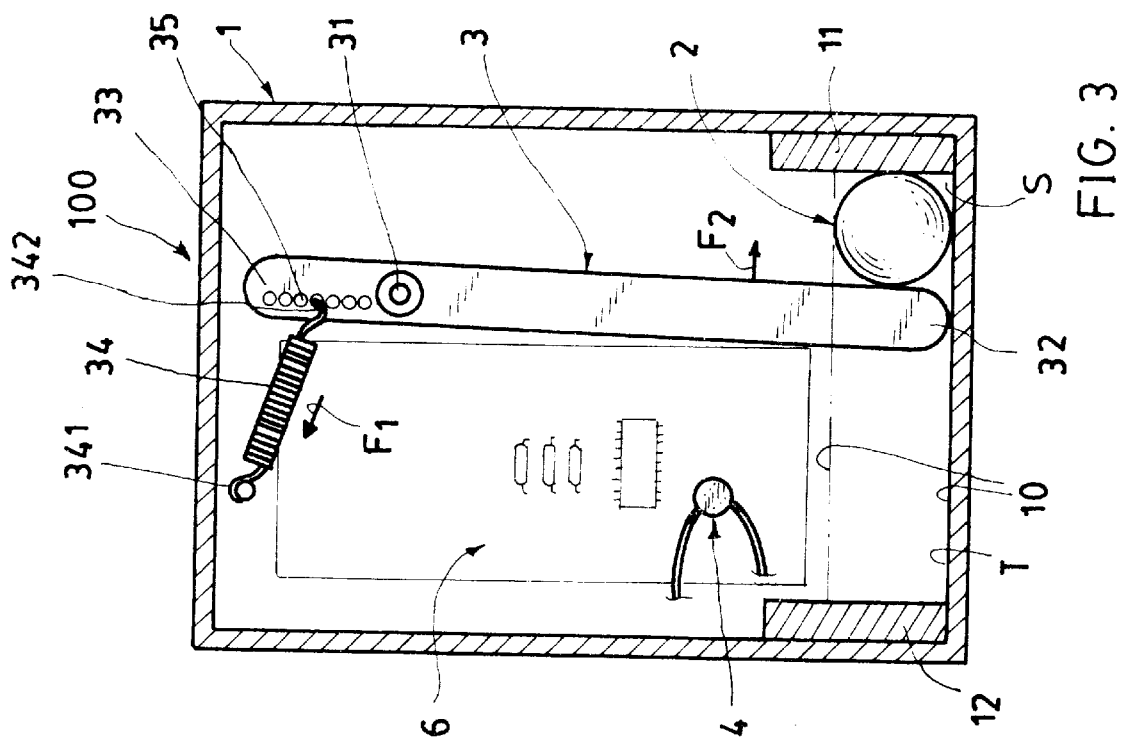
FIG. 5 is a partial sectional drawing of the present invention at its triggered state.

As shown in FIGS. 1–8, the automatic emergency signal means for vehicles 100 comprises: a casing 1 mounted on a car or vehicle C, a movable weight 2 movable or rolling in the casing 1, a restoring lever 3 resiliently contacting the weight 2 for restoring the weight 2 towards an original starting position S in the casing 1, a sensor 4 provided at a target position T opposite to the starting position S to be actuated by the movable weight 2 when moving towards the target position T, due to inertia of the weight 2 upon a sudden or emergency brake of the car, for sensing a trigger signal, an amplifier or AMP 5 connected to the sensor 4 for receiving and amplifying the trigger signal as sent from the sensor 4, a controller or CONTRL 6 electrically connected with the amplifier 5 for receiving and treating trigger signal from the sensor 4, at least a warning light 7 provided at a rear portion of the car and electrically connected to the controller 6 to be controlled for turning on or off the warning light 7, a buzzer 8 electrically connected to the controller 6 to be turned on or off by the controller 6, and a power source 9 electrically connected with the controller 6 for powering the controller 6 and all other electronic elements of the present invention.

The power source 9 may be the batteries already formed in situ in the car. So, the present invention may be connected with the original electric system in a car.

The casing 1 includes: a groove 10 longitudinally formed in the casing 1 preferably located at a bottom of the casing and being parallel to a longitudinal axis X formed at a longitudinal center of the car or vehicle C (FIG. 1), a starting bumper 11 which may be made of rubber or other elastomers fixed in a rear portion of the casing adjacent to the starting position S where the movable weight 2 is normally rested upon, and a target bumper 12 which may also be made of elastomers fixed in a front portion of the casing 1 adjacent to the target position T where the movable weight 2 reaches due to inertia upon an emergency brake of the car C.

The movable weight 2 may be made of a heavy steel, iron or metallic ball having suitable weight which may be dependent upon the moving stroke of the weight 2 from the starting positions S to the target position T, the moment of the forwardly running (or moving) weight 2 (in direction F) when an emergency brake is actuated for suddenly stopping the car, the resistance of the restoring lever 3 resiliently contacting the weight 2, and the other related factors.

The movable weight 2 may also be modified as a roller, a wheel, a rotor or even a cylindrical plunger slidably movable in the groove 10 recessed in the casing, not limited in the present invention.

Figure 7:
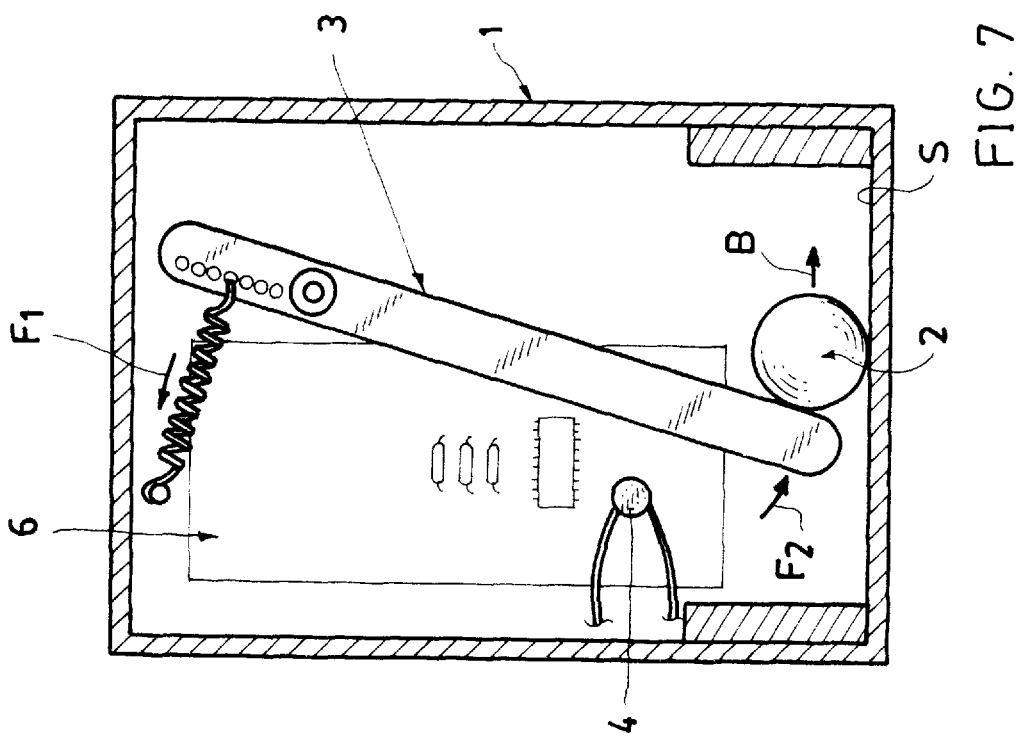
FIG. 7 shows an intermediate stroke of the movable weight without actuating the sensor of the present invention.

The restoring lever 3 includes: a pivot 31 for pivotally mounting the lever 3 in the casing 1, a lower actuating end 32 normally resiliently contacting the movable weight 2, an upper restoring end 33 formed on an upper portion of the lever 3 having a restoring spring 34 connected on the restoring end 33, and the restoring spring 34 retained in and tensioned (Fl) to an upper portion of the casing 1 for biasing (F2) the lower actuating end 32 for resiliently contacting the weight 2 to have a tendency to be restored (B) to the starting position S (FIG. 7).

The upper restoring end 33 of the restoring lever 3 is longitudinally drilled with a plurality of perforations 35 each perforation 35 adapted for fixing an adjustable spring end 342 of the restoring spring 34 in the perforation 35 while a fixed spring end 341 of the restoring spring 34 is fixed at a stem in the casing 1.

The resilience of the lever 3 should be well adjusted, not to retard the forward running or moving (F) of the movable weight 2 upon emergency brake of the car in order for a successful "arrival" of the weight 2 to sense the sensor 4 of the present invention. However, if not encountering the situation of emergency brake such as just a stop in a cross road under red light, the "smooth" stop of the driving car will only have a slight movement of the weight 2 such as shown in FIG. 7 unable to sense the sensor 4 so that the resilience of the lever 3 will restore the weight 2 backward (B) towards its original starting position S.

Figure 8:
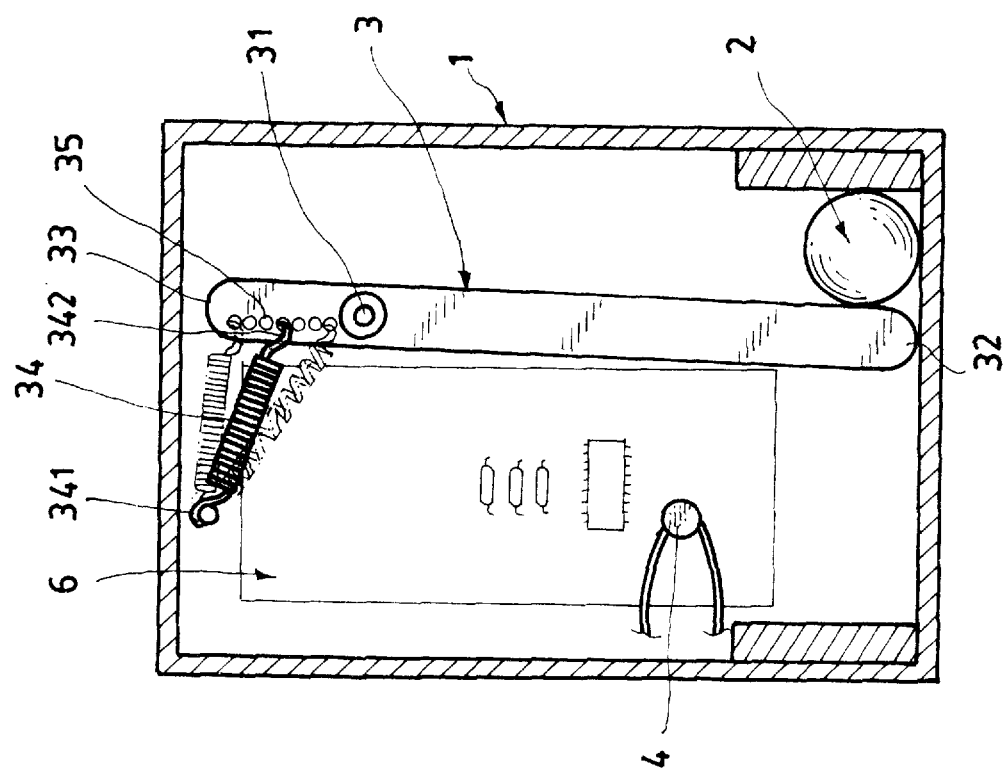
FIG. 8 shows an adjustment for the restoring lever of the present invention.

The resilience of the restoring spring 34 may be adjusted by fastening the spring end 342 in the proper perforation 35 as shown in FIG. 8 for obtaining the desired resilience of the spring 34.

Figure 6:
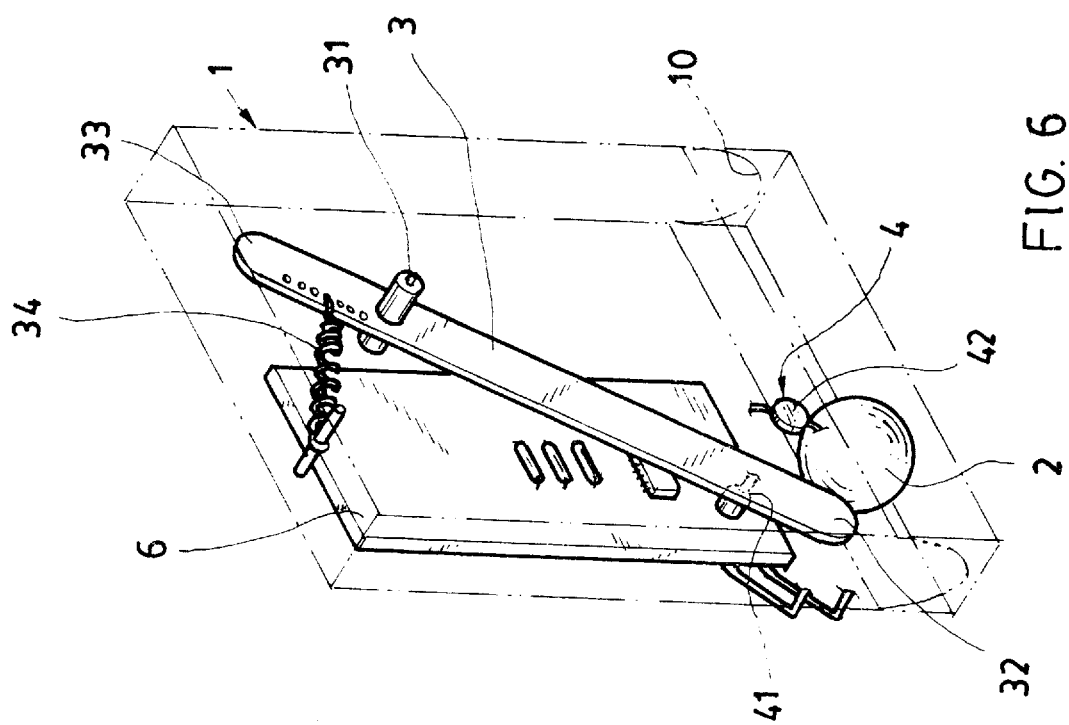
FIG. 6 is a perspective view of the present invention of FIG. 5.
Figure 4:
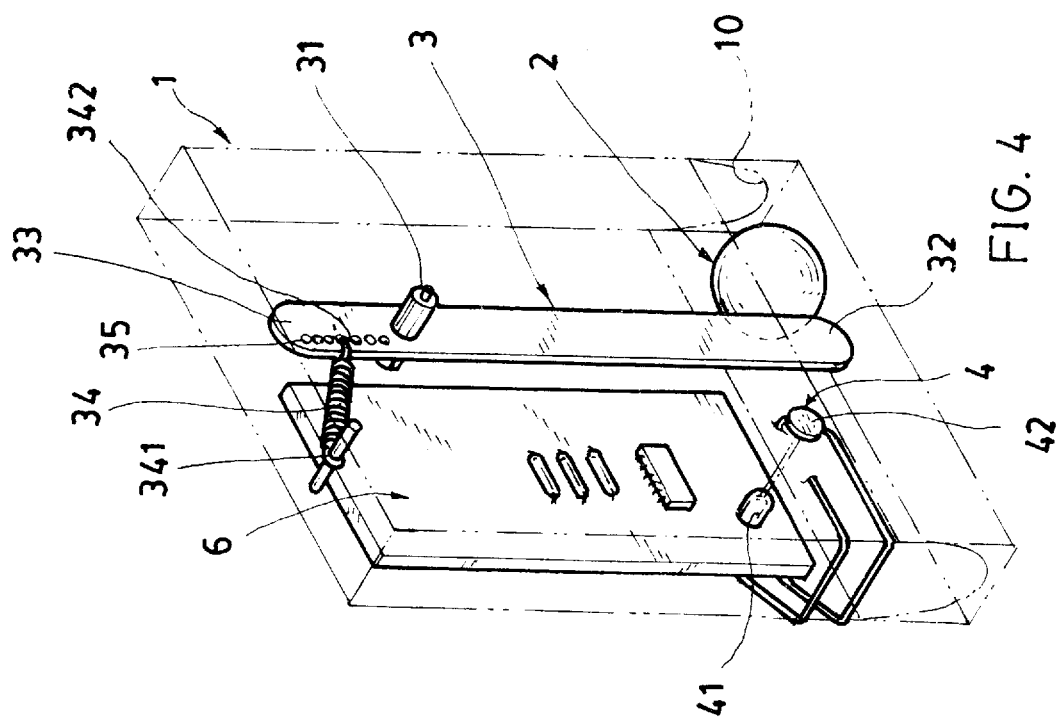
FIG. 4 is a perspective view of the present invention of FIG. 3.

The sensor 4 as electrically connected to the controller 6 through the amplifier 5 especially as shown in FIGS. 4,6 includes: a photo emitter 41 such as a light-emitting diode (LED) for emitting light outwardly, and a photo receiver 42 such as a photo cell facing the photo emitter 41 for receiving the Light as emitted from the photo emitter for conducting the photo receiver, whereby upon a forward moving of the weight 2 due to emergency brake, the light emitted from the emitter 41 towards the receiver 42 will be shielded by the biasing lever 3 to disconnect the photo receiver 42 to sense and output trigger signal to the controller 6.

The trigger signal from the sensor 4 will be amplified by the amplifier 5 and then sent to the controller 6 to trigger the controller 6 to light up the warning light 7 provided on a rear portion of the car for alerting any following vehicle.

The controller 6 may be an integrated circuit, a microprocessor or an electronic circuit for treating the trigger signal and for controlling the actuation time period of the warning light.

The controller 6 may be further connected with a buzzer 8 for producing a warning voice such as "watch out!" or other proper warning voice of alarming sound, not limited in the present invention.

The warning light 7 may be twin lights or plural lights provided at the rear end of the car. The warning light 7 may be a yellow light. However, the number, locations, colors, or shapes of the warning light 7 are not limited in the present invention.

Figure 9:
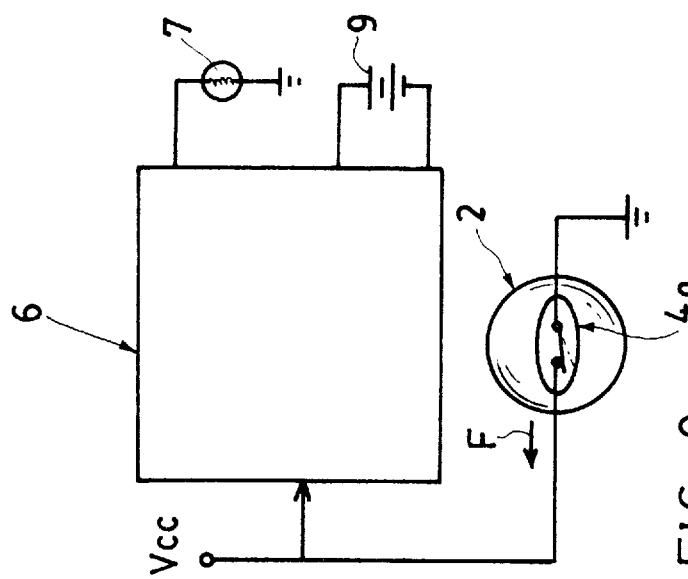
FIG. 9 shows another preferred embodiment of the present invention.

As shown in FIG. 9, the sensor 4 is modified to be a trigger switch selected from a normally-open reed switch 4a; whereby upon a forward rolling (F) of the weight 2 made of magnetic material to close the reed switch 4a, a trigger signal will be sent to the controller 6 for lighting up the warning light 7.

Figure 10:
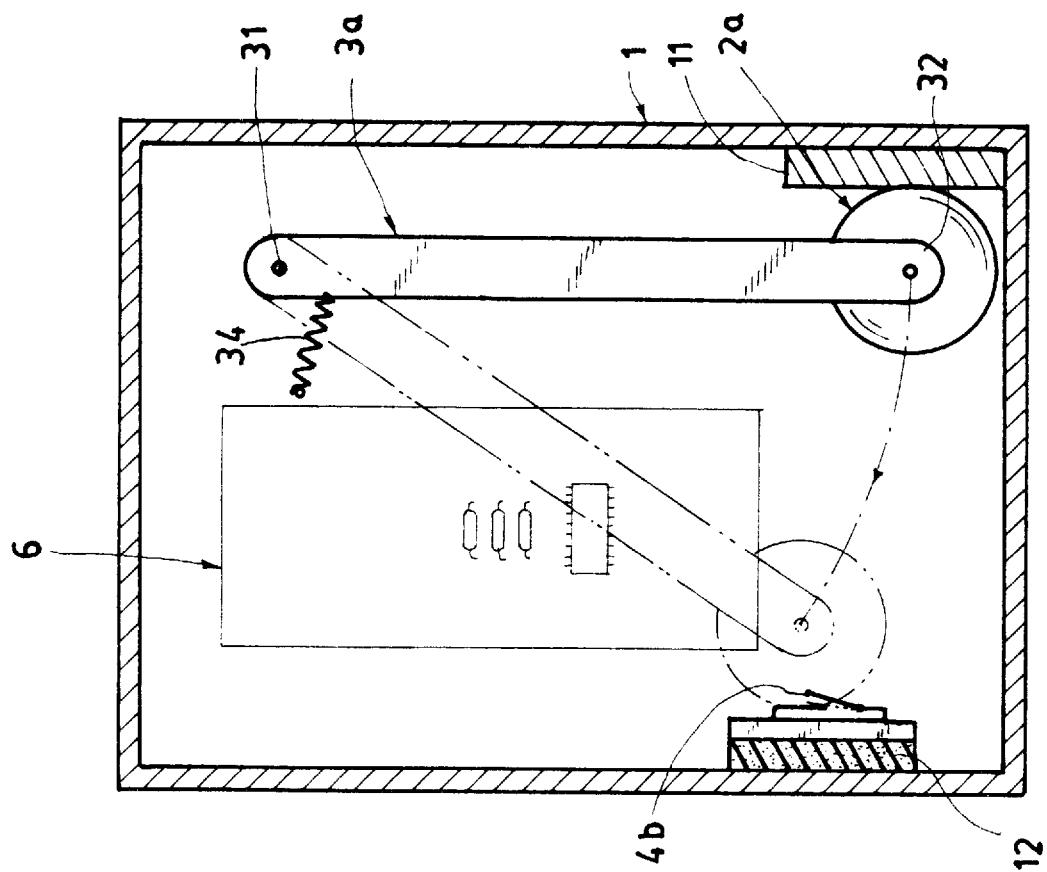
FIG. 10 shows still another preferred embodiment of the present invention.

As shown in FIG. 10, the weight 2 is modified to be a pendulum weight 2a fixed at a lower end portion 32 of a pendulum lever 3a pivotally and pendently secured in the casing 1 by a pivot 31 with the pendulum weight 2a normally gravitationally pendent to be leaned upon the starting bumper 11, and a trigger switch selected from a micro switch 4b mounted on the target bumper 12 provided in a front portion of the casing 1, whereby upon an emergency brake of the car, the pendulum lever 3a and weight 2a will be pendulously biased forwardly to depress the micro switch 4b which is electrically connected to the controller 6 for triggering the controller 6 for lighting up the warning light 7 as electrically connected with the controller 6. The restoring spring 34 is also provided as shown in FIG. 10.

The warning light 7 may be automatically switched off in a pre-determined time interval in the controller 6. Naturally, an on-off switch (not shown) may be manually operated to turn off the warning light 7 or the buzzer 8.

The present invention is superior to the conventional car warning signal device with the advantage that a smooth brake of a car will not actuate the yellow warning light and the warning light 7 may only be lit up in case of a car emergency brake. Therefore, this invention may increase its alerting effect for enhancing traffic safety.

The present invention nay he further modified without departing from the spirit and scope of this invention. For instance, the electronic circuit of the sensor, the amplifier and the controller may be modified and varied by those skilled in the art, not limited in the present invention.

I claim:

1. An automatic emergency signal means for vehicles comprising:

a casing mounted in a vehicle and having a groove longitudinally recessed in said casing and defining a starting position in a rear portion in said casing and a target position in a front portion in said casing;

a movable weight movable in said groove in said casing;

a restoring lever pivotally mounted in said casing resiliently contacting said movable weight for normally biasing said weight towards the starting position in said casing;

a sensor provided in said casing at said target position for sensing a trigger signal when the weight is forwardly moved to approximate said sensor due to arm inertia of the weight upon an emergency brake of the vehicle;

an amplifier electrically connected with said sensor for amplifying said trigger signal as output from said sensor; and a controller electrically connected to said amplifier for receiving and treating said trigger signal far controlling on and off of at least a warning light electrically connected to said controller, said controller electrically connected to a power source far powering said controller; whereby upon an emergency brake of the vehicle, said movable weight is forwardly moved to sense said sensor to trigger said controller for lighting up said warning light for alerting a following vehicle.

2. An automatic emergency signal means for vehicles according to claim 1, wherein said controller is further connected with a buzzer for sounding an alarming voice and sound from said buzzer upon receiving of the trigger signal by said controller.

3. An automatic emergency signal means for vehicles according to claim 1, wherein said warning light is at least a yellow light provided at a rear end of the vehicle.

4. An automatic emergency signal means for vehicles according to claim 1, wherein said power source is a battery stored in vehicle.

5. An automatic emergency signal means for vehicles according to claim 1, wherein said casing includes: said groove longitudinally formed in the casing in a bottom of the casing and being parallel to a longitudinal axis formed at a longitudinal center of the vehicle, a starting bumper fixed in a rear portion of the casing adjacent to the starting position where the movable weight is normally rested upon, and a target bumper fixed in a front portion of the casing adjacent to the target position where the movable weight reaches due to inertia upon an emergency brake of the vehicle.

6. An automatic emergency signal means for vehicles according to claim 1, wherein said movable weight is made of a heavy ball, having a weight dependent upon a moving stroke of the weight from the starting position to the target position, the moment of the weight as forwardly moving when an emergency brake is actuated for suddenly stopping the vehicle, the resistance of the restoring lever resiliently contacting the weight.

7. An automatic emergency signal means for vehicles according to claim 1, wherein said movable weight is selected from a ball, a roller, a wheel, a rotor and a cylindrical plunger slidably movable in the groove recessed in the casing.

8. An automatic emergency signal means for vehicles according to claim 1, wherein said restoring lever includes: a pivot for pivotally mounting the lever in the casing, a lower actuating end normally resiliently contacting the movable weight, an upper restoring end formed on an upper portion of the lever having a restoring spring connected on the upper restoring end, and the restoring spring retained in and tensioned to an upper portion of the casing for biasing the lower actuating end for resiliently contacting the weight to have a tendency to be restored to the starting position.

9. An automatic emergency signal means for vehicles according to claim 8, wherein said upper restoring end of the restoring lever is longitudinally drilled with a plurality of perforations each said perforation adapted for fixing an adjustable spring end of the restoring spring in the perforation and said restoring spring having a fixed spring end thereof fixed in the casing 1.

10. An automatic emergency signal means for vehicles according to claim 1, wherein said restoring lever has an adjustable resilience of the lever without retarding a forward moving of the movable weight upon emergency brake of the vehicle in order for approximating the weight to sense the sensor.

11. An automatic emergency signal means for vehicles according to claim, 1, wherein said sensor as electrically connected to the controller through the amplifier includes: a photo emitter for emitting a light, and a photo receiver facing the photo emitter for receiving the light as emitted from the photo emitter for conducting the photo receiver, whereby upon a forward moving of the weight due to emergency brake, the light emitted from the emitter towards the receiver will be shielded by the biasing lever to disconnect the photo receiver to sense and output a trigger signal to the controller to light up said warning light as connected to said controller.

12. An automatic emergency signal means for vehicles according to claim 11, wherein said controller is selected from an integrated circuit, a microprocessor and an electronic circuit For treating the trigger signal and for controlling the on and off of the warning light.

13. An automatic emergency signal means for vehicles according to claim 1, wherein said movable weight is a magnetic ball and said sensor is a trigger switch selected from a normally-open reed switch; whereby upon a forward rolling of the magnetic ball to close the reed switch, a trigger signal will be sent to the controller for lighting up the warning light.

* * * * *